United States Patent
Schaffler

(10) Patent No.: US 10,875,387 B1
(45) Date of Patent: Dec. 29, 2020

(54) REPLACEMENT VENT CLIP FOR USE WITH VEHICLE VENT LOUVERS

(71) Applicant: Leftcoast Diversified, Inc., Orange, CA (US)

(72) Inventor: Samuel Schaffler, Tulsa, OK (US)

(73) Assignee: Leftcoast Diversified, Inc, Fullerton, CA (US)

( * ) Notice: Subject to any disclaimer, the term of this patent is extended or adjusted under 35 U.S.C. 154(b) by 315 days.

(21) Appl. No.: 15/174,574

(22) Filed: Jun. 6, 2016

Related U.S. Application Data

(60) Provisional application No. 62/170,990, filed on Jun. 4, 2015.

(51) Int. Cl.
*B60H 1/34* (2006.01)
*B60H 1/00* (2006.01)

(52) U.S. Cl.
CPC ....... *B60H 1/3421* (2013.01); *B60H 1/00264* (2013.01)

(58) Field of Classification Search
CPC . B60H 1/3421; B60H 1/00264; B60H 3/0028
USPC .......................................................... 454/155
See application file for complete search history.

(56) References Cited

U.S. PATENT DOCUMENTS

| | | | | |
|---|---|---|---|---|
| 5,364,303 A * | 11/1994 | Terry | ..................... | B60H 1/345 454/155 |
| 6,080,059 A * | 6/2000 | Kim | ........................ | B60H 3/06 454/155 |
| 6,342,003 B1 * | 1/2002 | Wang | ..................... | B60H 1/345 422/122 |
| 6,589,110 B2 * | 7/2003 | Tanabe | ................. | B60H 1/3421 454/155 |
| 7,162,773 B2 * | 1/2007 | Song | ..................... | B60H 1/3414 16/110.1 |
| 7,780,094 B2 * | 8/2010 | Caserta | ................... | A61L 9/127 239/289 |
| 7,790,000 B2 * | 9/2010 | Matsuda | ............. | A01M 1/2044 159/27.3 |
| 9,291,191 B1 * | 3/2016 | Rejkowski | ................ | F16C 1/12 |

(Continued)

FOREIGN PATENT DOCUMENTS

| | | | | |
|---|---|---|---|---|
| GB | 2196421 A | * | 4/1988 | ........... B60H 1/3421 |
| GB | 2391932 B | * | 6/2004 | ............... A61L 9/12 |

(Continued)

*Primary Examiner* — Edelmira Bosques
*Assistant Examiner* — Frances F. Hamilton
(74) *Attorney, Agent, or Firm* — Gable Gotwals

(57) ABSTRACT

A replacement vent clip for attachment to a louver of an air vent assembly when the air vent assembly is installed in a motor vehicle includes two posts extending rearward from a lower wall of the vent clip and a lower and upper wall spaced apart from one another to create an open back end spanning an entire width of the vent clip. The open back end includes a channel sized smaller in height than a height of an opposing horizontal louver of an air vent assembly and includes a lip arranged to move to a second greater height when engaging the horizontal louver. The two longitudinally extending, spaced apart posts align the vent clip with a vertical post of an air vent assembly. Once the louver is contained within the vent clip, the channel moves back to its original height and captures the louver within the clip.

4 Claims, 3 Drawing Sheets

(56) References Cited

U.S. PATENT DOCUMENTS

| | | | | |
|---|---|---|---|---|
| 2001/0031619 A1* | 10/2001 | Yabuya | ................ | B60H 1/3421 |
| | | | | 454/155 |
| 2002/0178744 A1* | 12/2002 | Tanabe | ................ | B60H 1/3421 |
| | | | | 62/407 |
| 2007/0001025 A1* | 1/2007 | Caserta | .................. | A61L 9/127 |
| | | | | 239/59 |
| 2007/0264169 A1* | 11/2007 | Chen | ........................ | A61L 9/12 |
| | | | | 422/124 |
| 2008/0119124 A1* | 5/2008 | Okuno | ................ | B60H 1/3428 |
| | | | | 454/69 |
| 2008/0224007 A1* | 9/2008 | Mo | ......................... | B60R 11/00 |
| | | | | 248/231.81 |
| 2009/0114736 A1* | 5/2009 | Janakat | .................... | A61L 9/127 |
| | | | | 239/44 |
| 2009/0286462 A1* | 11/2009 | Goto | .................... | B60H 1/3428 |
| | | | | 454/155 |
| 2010/0314461 A1* | 12/2010 | Gruenbacher | ............ | A61L 9/12 |
| | | | | 239/6 |
| 2012/0129444 A1 | 5/2012 | Kober et al. | | |
| 2013/0267158 A1* | 10/2013 | Noichl | ................ | B60H 1/3414 |
| | | | | 454/155 |
| 2014/0206270 A1* | 7/2014 | Demerath | ............ | B60H 1/3421 |
| | | | | 454/155 |
| 2015/0283883 A1* | 10/2015 | Schouten | ............ | B60H 3/0028 |
| | | | | 239/57 |
| 2016/0229259 A1* | 8/2016 | Kwon | .................. | B60H 1/3414 |
| 2017/0057326 A1 | 3/2017 | Cho | | |

FOREIGN PATENT DOCUMENTS

| | | | | |
|---|---|---|---|---|
| JP | 09323576 A | * | 12/1997 | |
| KR | 100841547 B1 | * | 6/2008 | |
| WO | WO-2015084100 A1 | * | 6/2015 | ............... B60H 1/34 |

* cited by examiner

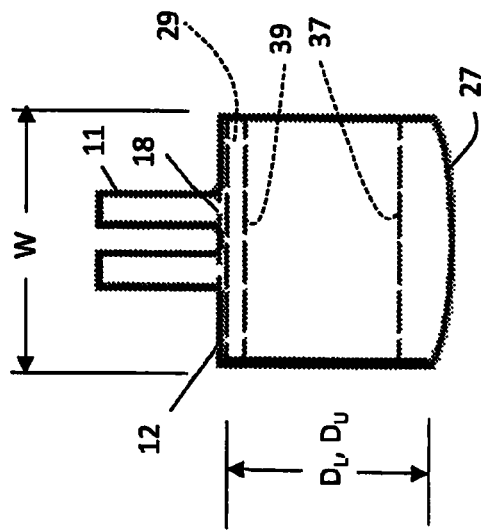
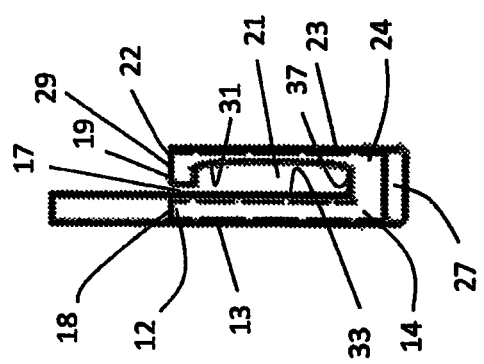
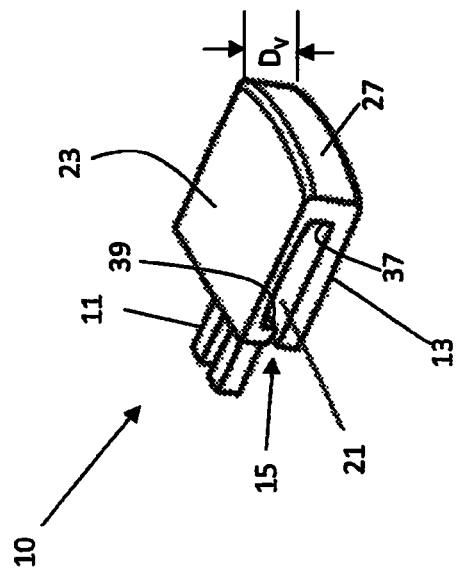
FIG. 4
FIG. 5
FIG. 6

REPLACEMENT VENT CLIP FOR USE WITH VEHICLE VENT LOUVERS

CROSS-REFERENCE TO PENDING APPLICATIONS

This application claims priority to U.S. Prov. Pat. Appl. Ser. No. 62/170,990, filed Jun. 4, 2015.

BACKGROUND

A vent clip is used to control the position of a vehicle's air vent louvers. The clip is typically a two-part assembly (see FIGS. 1-3) factory-installed and permanently connected to a vertical post and horizontal louver of the air vent housing assembly. If the clip breaks during use, a user must replace the entire air vent housing assembly in order to get a new vent clip. Because replacement of the housing can be a time-consuming and expensive process, many users simply live with the broken clip and resort to using a finger, pen or pencil to adjust the louvers.

Automobile forums and message boards suggest there have been many attempts to design an aftermarket solution which requires no disassembly or replacement of the vent assembly, but no designs have proven to be successful. Therefore, a need exists for a vent clip that can replace a broken vent clip without having to remove and replace the air vent housing assembly.

SUMMARY

Embodiments of a vent clip of this disclosure include an upper wall spanning an entire width of the clip including a forwardmost end and a rearmost end; a lower wall spanning an entire width of the clip and located below and spaced apart from the upper wall, the lower wall including a forwardmost end and a rearmost end; a front wall located at, and connecting, the forwardmost ends of the upper and lower walls, a cavity being formed between the upper and lower walls; a rear wall located at the rearmost end of the upper wall, the rear wall extending downward partway toward the rearmost end of the lower wall to create an open channel to the cavity spanning an entire width of the clip; and two spaced-apart, longitudinally extending alignment posts connected to and extending horizontally away from the rearmost end of the lower wall.

BRIEF DESCRIPTION OF THE DRAWINGS

FIG. 4 is an isometric view of an embodiment of a replacement vent clip of this disclosure.

FIG. 5 is a top view of the replacement vent clip of FIG. 4.

FIG. 6 is a side elevation view of the replacement vent clip of FIG. 4.

ELEMENTS AND NUMBERING USED IN THE DRAWINGS

Figure 1:
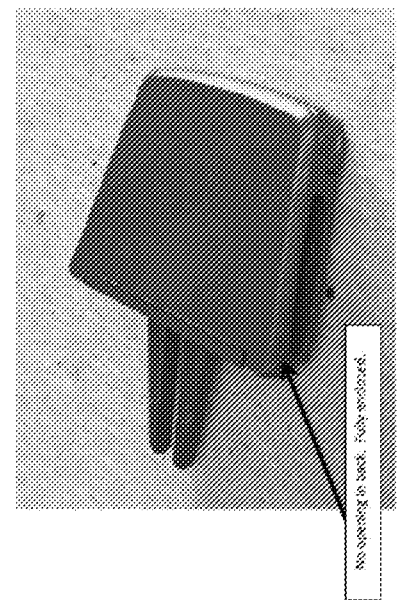
FIG. 1 is a photograph of a prior art vent clip assembly.
Figure 2:
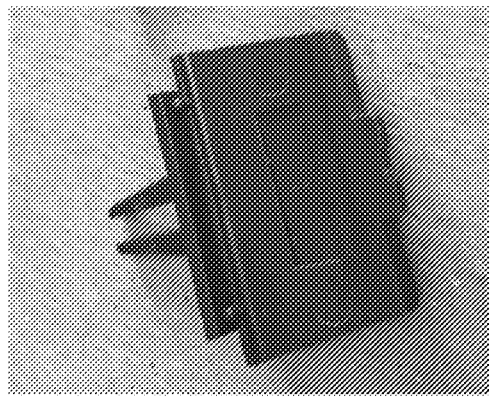
FIG. 2 is a photograph of the lower or bottom half of the vent clip assembly of FIG. 1.
Figure 3:
FIG. 3 is a photograph of the upper or top half of the vent clip assembly of FIG. 1.

10 Vent clip
11 Longitudinally extending post
12 Rearmost end of lower wall
13 Lower wall
14 Foremost end of lower wall
15 Open back end
17 Gap or channel
18 Foremost end of longitudinally extending post
19 Bottommost end (lip) of rear wall
21 Cavity
22 Rearmost end of upper wall
23 Upper wall
24 Foremost end of upper wall
27 Front wall
29 Rear wall
31 Curved ceiling
33 Planar floor
37 Foremost end wall of cavity
39 Rearmost end wall of cavity

DETAILED DESCRIPTION

Figure 7:
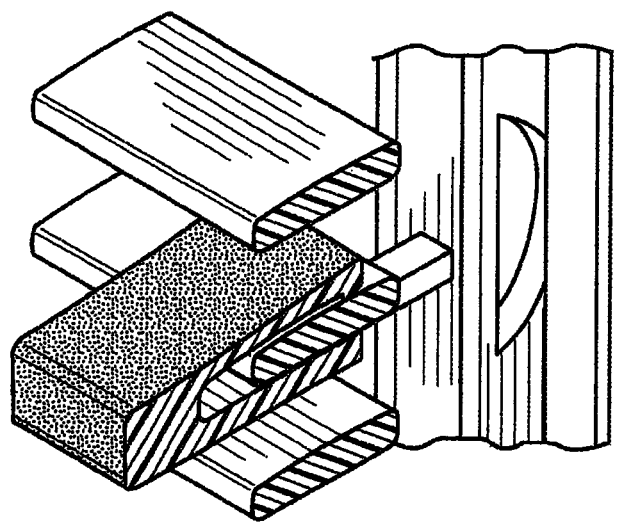
FIG. 7 is an isometric cross section view of an embodiment of a replacement vent clip when removably connected to an air vent assembly of a motor vehicle; the clip shown in a flexed position when being inserted onto the louver.
Figure 8:
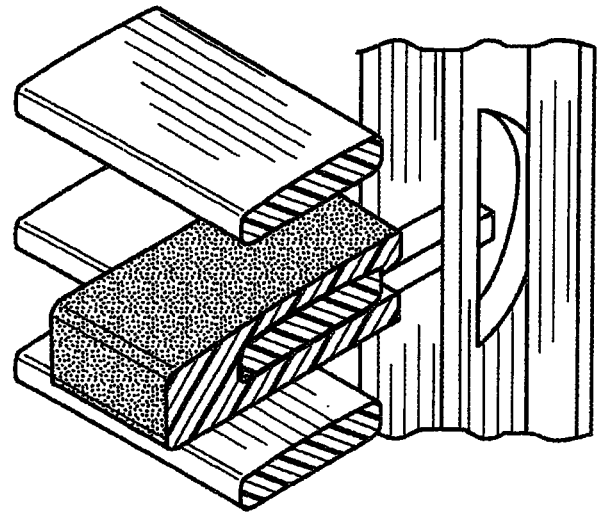
FIG. 8 is an isometric cross section view of the replacement clip of FIG. 7 after insertion onto the louver, the clip in a closed position and the louver contained in the cavity.

Referring to FIGS. 4 to 8, embodiments of a replacement vent clip 10 of this disclosure is a one piece clip having an upper wall 23 and a lower wall 13 spaced apart from one another by, connected at a respective foremost end 24, 14 to a front wall 27. This spacing creates a cavity 21 located between the upper and lower walls 23, 13, the front wall 27 being a foremost end wall of the cavity 21. The cavity 21 may have a curved ceiling 31 (formed by the upper wall 23) and a planar floor 33 (formed by the lower wall 13).

A rear wall 29 is connected to a rearmost end 22 of the upper wall 24. The rear wall 29 extends at a right angle only partway downward to the rearmost end 12 of the lower wall 13, thereby creating an open back end 15 with a gap or channel 17 provided between the lower and upper walls 13, 23. The bottommost end 19 of the rear wall 29 provides a lip or edge to the channel 17. The open back end 15 extends the entire width of the clip 10. In embodiments, the lip 19 extends partway from the upper wall 23 toward the lower wall 13.

Two longitudinally extending, spaced apart posts 11 extend rearward from the rearmost end 12 of the lower wall 13 of the clip 10. The foremost end 18 of the posts 11 connect to the rearmost end 12 of the lower wall 13. The two posts 11 align the clip 10 with a vertical post of the air vent assembly. The open back end 15 then allows one of the horizontal louvers of the air vent assembly to be captured by the clip 10.

The gap or channel 17 provided at the open back end 15 is sized slightly smaller in height than the cross section height of the horizontal louver the clip 10 is intended to capture. As a user aligns the posts 11 of the clip 10 with that of the air vent assembly and begins to push the clip 10 toward the louver, the louver hits the lip or edge 19 of the channel 17 which then forces the channel 17 to open up enough that the louver can pass by. As the louver clears this lip 19, the louver enters the cavity 21, which is sized to accommodate a total cross section depth of the louver. Once the louver is fully inserted into the cavity 21, the louver has completely cleared the lip 19 and the channel 17 returns to its original size, with the lip 19 preventing the user from accidentally pulling the clip 10 off the louver. The open back end 15 remains open, permitting the clip 10 to be intentionally removed from the louver if desired in a direction opposite that of installation.

The clip 10 may be made of a plastic material and color the same as, or similar to, the original factory clip. The clip 10 can be 3D printed if desired. In embodiments, the replacement vent clip 10 is configured for attachment to and intentional detachment from the louver of an air vent assembly when the louver and air vent assembly are in a final installed state within the motor vehicle. The vent clip 10 may be a one-piece clip that includes the following features:

an upper wall 23 having a foremost end 24 and a rearmost end 22 spaced apart from the foremost end 24, the upper wall 23 being a continuous solid wall spanning an entire lateral width W of the vent clip 10 across the foremost and rearmost ends 24, 22 of the upper wall 23 and an entire longitudinal distance $D_U$ between the foremost and rearmost ends 24, 22 of the upper wall 23;

a lower wall 13 located below and spaced apart from the upper wall 23, the lower wall having a foremost end 14 and a rearmost end 12 spaced apart from the foremost end 14 of the lower wall 13, the lower wall 13 being a continuous solid wall spanning the entire lateral width W of the vent clip 10 across the foremost and rearmost ends 14, 12 of the lower wall W and an entire longitudinal distance $D_L$ between the foremost and rearmost ends 14, 12 of the lower wall 13, said entire longitudinal distances $D_U$, $D_L$ of the upper and lower walls 23, 13 being equal distances;

a front wall 27 located at a respective foremost end 24, 14 of the upper and lower walls 23, 13, the front wall 27 integrally formed with and connecting the upper and lower walls 23, 13, the front wall 27 being a continuous solid wall extending the entire lateral width W of the vent clip 10 across the foremost ends 14, 24 of the upper and lower walls 23, 13 and an entire vertical distance $D_V$ between the upper and lower walls 23, 13; a cavity 21 being formed by and between the upper, lower, and front walls 23, 13, 27, the cavity 17 being a continuous smooth-walled cavity extending the entire lateral width W of the vent clip across the foremost 24, 14 and rearmost ends 22, 12 of the upper and lower walls 23, 13 and the entire longitudinal distances $D_U$, $D_L$ between the foremost 24, 14 and rearmost ends 22, 12 of the upper and lower walls 23, 13 and the entire vertical distance $D_V$ of the front wall between the upper and lower walls, the front wall 27 being a foremost end wall 37 of the cavity 21;

a rear wall 29 located at the rearmost end 22 of the upper wall 23 and integrally formed with the upper wall 23 at a right angle to the upper wall 23, the rear wall 29 being a continuous solid wall spanning the entire lateral width W of the vent clip 10 across the rearmost end 22 of the upper wall 23 and extending partway in a vertical direction from the rearmost end 22 of the upper wall 23 toward the rearmost end 12 of the lower wall 13, the rear wall 29 being a rearmost end wall 39 of the cavity 21;

an open channel 17 to the cavity 21 located directly below a bottommost end 19 of the rear wall 29 and directly above the rearmost end 12 of the lower wall 13, the open channel 17 being a continuous uniform channel spanning the entire lateral width W of the vent clip 10 across the rearmost ends 12, 22 of the upper and lower walls 13, 23 and remaining open in a first height when the vent clip 10 is in a louver-attached state with a full cross-section of the louver housed within the cavity 21, the vent clip 10 when in the louver-attached state is intentionally detachable from the louver in a direction perpendicular to the louver and opposite the open channel 17 and when in a louver-detached state attachable to the louver in a direction perpendicular to the louver and toward the open channel 17, and the open channel 17 moving between the first height and a second height greater than the first height when the full cross-section of the louver passes through the open channel 17, the open channel returning to the first height when the full cross-section of the louver clears the open channel 17; and two spaced-apart, longitudinally extending, alignment posts 11 having a foremost end 18 integrally formed with, connected to, and extending horizontally away from the rearmost end 12 of the lower wall 13, and extending rearward of the rear wall 29, said alignment posts 11 each lying in a same plane as the lower wall 13 along respective entire lengths $L_P$ of said alignment posts 11.

What is claimed:

1. A vent clip configured for attachment to and detachment from a louver of an air vent assembly of a motor vehicle when the louver and air vent assembly are in a final installed state within the motor vehicle, the vent clip comprising:

an upper wall including a foremost end and a rearmost end spaced apart from the foremost end, the upper wall being a continuous uninterrupted solid wall spanning an entire lateral width of the vent clip across the foremost and rearmost ends of the upper wall and an entire longitudinal distance between the foremost and rearmost ends of the upper wall;

a lower wall located below and spaced apart from the upper wall, the lower wall including a foremost end and a rearmost end spaced apart from the foremost end of the lower wall, the lower wall being a continuous uninterrupted solid wall spanning the entire lateral width of the vent clip across the foremost and rearmost ends of the lower wall and an entire longitudinal distance between the foremost and rearmost ends of the lower wall, said entire longitudinal distances of the upper and lower walls being equal distances;

a front wall located at a respective foremost end of the upper and lower walls, the front wall integrally formed with and connecting the upper and lower walls, the front wall being a continuous uninterrupted solid wall extending the entire lateral width of the vent clip across the foremost ends of the upper and lower walls and an entire vertical distance between the upper and lower walls;

a rear wall located at the rearmost end of the upper wall and integrally formed with the upper wall at a right angle to the upper wall, the rear wall being a continuous uninterrupted solid wall spanning the entire lateral width of the vent clip across the rearmost end of the upper wall and extending partway in a vertical direction from the rearmost end of the upper wall toward the rearmost end of the lower wall;

a cavity formed by and between the upper, lower, front and rear walls, the cavity being a continuous smooth-walled cavity extending the entire lateral width of the vent clip upper and lower walls, the entire longitudinal distances between the front and rear walls, and the entire vertical distance between the upper and lower walls, the front wall being a foremost end wall of the cavity, the cavity having an arched ceiling;

an open channel to the cavity located directly below a bottommost end of the rear wall and directly above the rearmost end of the lower wall, the open channel being a continuous uniform channel spanning the entire lateral width of the vent clip across the rearmost ends of the upper and lower walls; the open channel remaining open in a first height when the vent clip is in a louver-attached state with a full cross-section of the louver housed within the cavity, and the open channel remaining open in the first height when the vent clip is in a louver-detached state;

the vent clip when in the louver-attached state is detachable from the louver by moving the vent clip in a direction towards the open channel and opposite the front wall of the vent clip, the vent clip when in the louver-detached state is attachable to the louver by moving the vent clip in a direction toward the open channel and towards the front wall, and the open channel moving between the first height and a second height greater than the first height when the full cross-section of the louver passes through the open channel, the open channel returning to the first height when the full cross-section of the louver clears the open channel when attaching and detaching; and two spaced-apart, longitudinally extending, alignment posts having a foremost end integrally formed with, connected to, and extending horizontally away from the rearmost end of the lower wall, and extending rearward of the rear wall, said alignment posts each lying below the open channel and in a same plane as the lower wall along their respective entire lengths;

wherein the vent clip is formed of a single piece of material.

2. The vent clip according to claim 1, the cavity including a planar floor.

3. The vent clip according to claim 1, the rear wall being contained within the entire longitudinal distances of the upper wall and lower walls.

4. The vent clip according to claim 1, the cavity being sized to accommodate a total depth of the louver.

\* \* \* \* \*